(No Model.)
D. E. BARTON.
CULTIVATOR.
No. 500,702. Patented July 4, 1893.
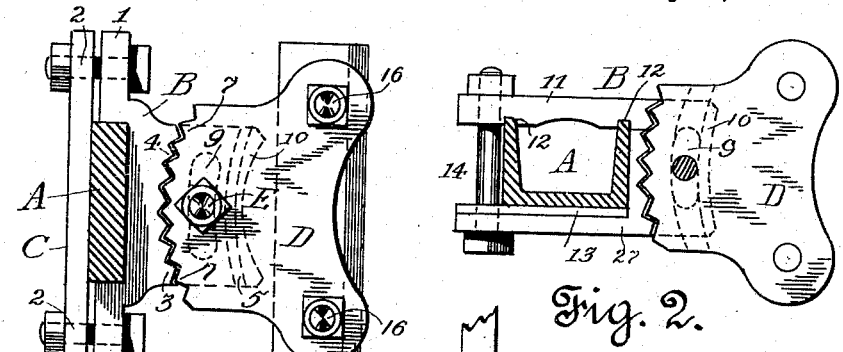
Fig. 2.
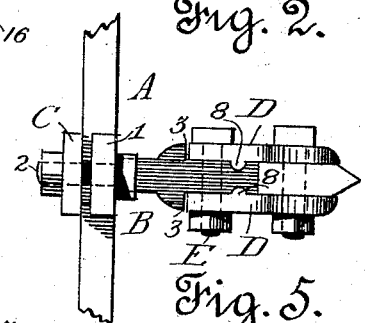
Fig. 5.
Fig. 1.
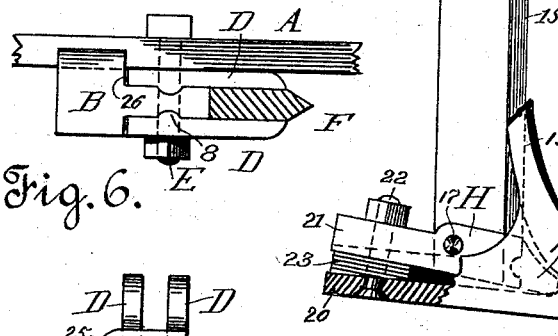
Fig. 6.
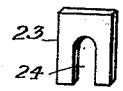
Fig. 4.
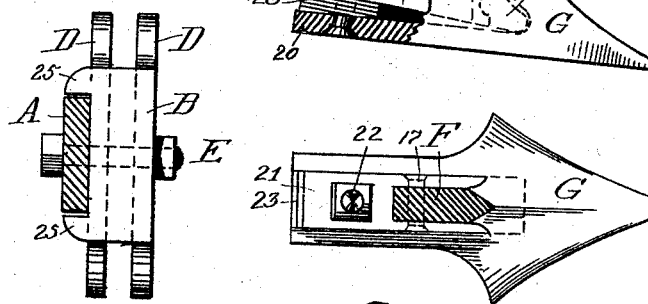
Fig. 7.　　Fig. 3.
Witnesses,
L. W. Seely
T. C. Fadden
Inventor,
Delbert E. Barton

UNITED STATES PATENT OFFICE.

DELBERT E. BARTON, OF SAN FRANCISCO, CALIFORNIA.

CULTIVATOR.

SPECIFICATION forming part of Letters Patent No. 500,702, dated July 4, 1893.

Application filed December 22, 1891. Serial No. 415,873. (No model.)

*To all whom it may concern:*

Be it known that I, DELBERT E. BARTON, a citizen of the United States, residing at San Francisco, in the county of San Francisco and State of California, have invented certain new and useful Improvements in Cultivators; and I do hereby declare that the following is a full, clear, and exact description thereof.

My invention relates to improvements in cultivators, and first, to the means of attaching the shovel standard to the cultivator beam, so that, while in use, it will have a perfectly rigid connection, but may at any time be adjusted so as to change the angle of the standard relatively to the beam.

It relates also to a novel and improved manner of constructing the standard itself. Also to an improved manner of connecting the shovel to its standard, so as to provide an adjustment, by means of which the position of the shovel may be changed, to compensate for wear, enabling it to do effective work for a much longer time than those commonly used.

The objects of the invention are sufficiently set forth above; and its construction, in detail, is fully hereinafter explained, and its novel features made the subject of claims following.

This specification should be read in connection with the accompanying drawings, in which—

Figure 1 is a side elevation, the cultivator beam being shown in section. Fig. 2 is a similar elevation with the standard removed, and showing a cultivator beam of different cross section. Fig. 3 is a horizontal section through the standard, showing a plan of the shovel. Fig. 4 is a view of the removable washer. Fig. 5 is a plan view of the construction shown in Fig. 1. Fig. 6 is a plan view of my device as applied to a cultivator having one or more longitudinal beams. Fig. 7 is an end view of the same.

Referring to Fig. 1:—A. represents the transverse beam of the cultivator, shown in section at a point where one of the shovel standards is connected to it; it being of course understood, that any number of such standards may be connected to the beam according to the width of the cultivator. B. is the clamping plate, recessed so as to fit upon the beam, and having flanges 1, 1, projecting above and below, through which pass the bolts 2. At the rear of the beam A is the plate C through which the bolts also pass, clamping the plate B firmly and rigidly to the beam, but permitting it, by loosening the bolts, to be adjusted laterally, enabling the shovels to be set nearer together or farther apart as may be required.

As shown in Fig. 5, which is a plan of the construction represented by Fig. 1, the clamping plate B has a forwardly projecting stub 10 (see dotted lines in Fig. 1 also), and is formed with curved shoulders 3, 3, provided with serrations or teeth 4, and with curved grooves 5, 5, placed upon opposite sides. The plates D between which the shovel standard is bolted, have their rear edges 6, formed upon a convex curve similar to that of the shoulders 3, and provided with teeth 7, which interlock or mesh with the teeth 4, when the parts are secured together. Both plates D are secured to the stub 10 of the clamping plate B, by the transverse bolt E, which passes through a curved slot 9 (dotted lines in Fig. 1) formed in the stub. The angle of the plates D relatively to the clamp B and cultivator beam, may thus be easily changed by removing or loosening this bolt and moving the plates D one or more teeth in either direction; and it follows, of course, that when the shovel standard is secured in position, its angle will be changed at the same time. This adjustment will be more particularly referred to in the description of the standard and of the attachment of the shovel to it. The serrations or teeth of the curved shoulders and rear edge of plate D, which intersect, may be dispensed with, and frictional contact allowed therebetween. Inasmuch as I make the curved shoulders and rear edge of the plates concave and convex respectively, it is obvious that the latter will turn or revolve within the former, when the shovel carrying standard comes in contact with obstructions in its line of travel, and thus cause tilting of the shovel or standard in order to clear the same. Where the before mentioned serrations or teeth are dispensed with, no brake pin need be employed as hereinafter set forth. Before proceeding to that part of the description, however, reference is made to Fig. 2, which shows a different and, in some respects, a preferable construction to that shown in Figs. 1 and 5. The differences, however, relate only to the attachment of the clamping plate to the beam, the adjusting devices being substantially like those before described. The cultivator beam A is in this case formed of channel iron which gives it very great strength and rigidity. This cross section of beam requires a somewhat different construction of the clamping plate, which is illustrated in the figure to which I am now referring. The recess in the clamping plate, which fits the beam as explained before in connection with Fig. 1 is made much deeper, and the upper rearwardly extending arm 11, formed by such recess, is provided with two lateral grooves 12, 12, into which the upturned edges of the channel beam fit, as shown. Between the lower rearwardly extending arm 27, and the lower surface of the beam, is inserted a plate 13, having a bolt hole which registers with similar holes in the ends of arms 11 and 27, and permits a bolt 14 to be passed through and secured, thereby rigidly clamping the arms to the beam by forcing the flanges of the beam into the grooves. The attachment of the plates D to the stub 10 of the clamping plate B and their adjustment upon the stub by means of interlocking teeth or serrations, is substantially the same as before described in Fig. 1 and will be readily understood without a repetition of that description.

The standard F to which the shovel is attached, is a straight or curved bar having its forward edge formed into a double bevel or knife edge as shown at 15. The standard is secured rigidly between the plates D, D, by lateral bolts 16, for the upper one of which may be substituted a wooden pin capable of breaking when the shovel comes in contact with some solid obstruction, thereby relieving the strain upon the shovel and standard. This break pin however, is only made use of when the curved shoulders and rear edge of the clamping plates are provided with intermeshing teeth, as before stated. When said teeth are dispensed with the clamping plates revolve upon transverse bolt E., as the shovel carrying standard comes in contact with solid obstructions. To the lower end of the standard is secured the shovel G, the attachment of which will now be explained, reference being had to Figs. 1 and 3. To the lower end of the standard is firmly secured a foot H. As I have shown it, this foot is a separate piece recessed so as to admit the end of the standard and riveted to it at 17; but, if preferred, the standard and foot may be formed in one piece, which they practically are, or they may be welded together. The foot is somewhat inclined from the horizontal as shown in Fig. 1. The shovel G is recessed internally so as to fit the forward projection 18 of the foot of the standard, and has an upward extension 19, curved from the point as shown, and angular in cross section, to bear upon the double bevel of the standard and inclose it, thus forming a guard to save the standard from wear. The bottom of the shovel is approximately horizontal and its heel 20, extends back below the rearward projection 21 of the foot, both parts having registering holes for the clamping bolt 22. The inclination of the foot and the horizontal position of the shovel leaves a space between their rear ends, which is filled by a washer or a number of washers 23, having slots or holes 24 (Fig. 4) which are clamped between such ends by the bolt 22. The wear of the shovel is mainly at the point and tends to form an upwardly inclined bevel, which prevents the shovel from doing effective work after being in use for some time, because the heel of the bevel thus formed by wear at the point of the shovel, strikes the ground first or before the point itself, and causes the shovel to run out. To bring the point again to its proper working position, it is only necessary to loosen or remove the bolt 22, take out one or more of the washers 23 (if there are several of them) or insert a thinner washer if there is but one. The tightening of the bolt 22 then brings the point of the shovel down so that the bevel formed by wear is brought into its approximate horizontal position; and theoretically this process can be repeated until the heel of the shovel is brought up against the rear of the foot. Practically however the shovel would become worn out and unfit for use before any such extended adjustment would be necessary.

It will be observed that the construction described, provides a double independent adjustment for the shovel, one just explained, and the other supplied by the adjustable interlocking teeth 4 and 7 which permit the angle of the entire shovel standard to be changed.

Figs. 6 and 7 show a modification of the device intended for use in cultivators having longitudinal beams to which the shovel standards are connected instead of the transverse beam shown in the remaining figures.

The clamping plate B is secured to one side of the beam A by means of side flanges 25, and the transverse bolt E, which passes through the beam and the stub 10 of the plate B. The latter is offset as shown at 26 to provide room for one of the plates D set between it and the beam, both plates D being secured by the curved tongues and grooves 5, 8, previously described, and by the bolt E which passes through the beam, clamping plate and both plates D. The adjustment of the parts by means of interlocking teeth is substantially as previously described, excepting that the curved slot 9, which in Fig. 1 is formed in the projecting stub of the clamping plate, is here formed in the plates D, D, this change being necessary because the bolt E passes through the cultivator beam, and the slot in the stub shown in Fig. 1, is only a hole in the stub of Fig. 6 large enough to admit the bolt.

Having thus described my invention, what

I desire to claim and secure by Letters Patent is—

1. In a cultivator, the combination of the cultivator beam, a clamping plate secured to the beam, and having a forwardly projecting stub, adjustable plates as D., attached to the stub, and a shovel standard secured between said plates substantially as described and shown.

2. In a cultivator, the combination of a cultivator beam, a clamping plate secured thereto, and having a forwardly projecting stub, plates as D., adjustably attached to said stub by a bolt, and curved slot, and a shovel standard and shovel, secured between said plates substantially as described and shown.

3. In a cultivator, the combination with a cultivator beam, clamping plate and adjustable plates attached to the latter of a shovel standard having its front edge formed into a double bevel, and a curved shovel fitting said bevel, and adjustable on the standard, substantially as described and shown.

4. In a cultivator, the combination of a standard, a foot secured to or formed with the lower end of said standard and projecting both to front and rear, a shovel bearing upon the front edge of the standard and the front projection of the foot and extending back beneath the rear projection of the foot, and a fastening bolt passing through the rear extensions of foot and shovel, all substantially as set forth.

5. In a cultivator, the combination of a cultivator beam, a clamping plate secured thereto, and having toothed shoulders, adjustable plates D, having toothed edges, and registering therewith, a fastening bolt passing through a slot and a shovel standard, secured between said plates, substantially as described.

6. In a cultivator, the combination of a cultivator beam, a clamping plate having a forwardly projecting stub, plates D having a shovel standard secured between them, and a tongue and groove connection between said plates and stub, substantially as set forth.

7. In a cultivator, a cultivator beam formed of channel iron, in combination with a recessed and grooved clamping plate, to which the shovel standard is connected, an independent plate or washer for forcing the upturned edges of the channel beam into the grooves in the clamping plate, and a fastening bolt, all substantially as described and set forth.

8. In a cultivator, the combination of the transverse beam thereof, clamping plate, provided with projecting stub, having concave shoulders secured thereto, standard plates adjustably secured to clamp plate, the edges thereof working within concave shoulders, and the shovel carrying standard secured between said plates.

In testimony whereof I have affixed my signature, in presence of two witnesses, this 5th day of December, 1891.

DELBERT E. BARTON.

Witnesses:
L. W. SEELY,
JOHN COFFEE.